US009764680B2

(12) United States Patent
Tamay

(10) Patent No.: US 9,764,680 B2
(45) Date of Patent: Sep. 19, 2017

(54) FOLDABLE LIGHT FIXTURE

(71) Applicant: Deere & Company, Moline, IL (US)

(72) Inventor: Miguel Tamay, Chihuahua (MX)

(73) Assignee: Deere & Company, Moline, IL (US)

( * ) Notice: Subject to any disclaimer, the term of this patent is extended or adjusted under 35 U.S.C. 154(b) by 235 days.

(21) Appl. No.: 14/805,609

(22) Filed: Jul. 22, 2015

(65) Prior Publication Data

US 2017/0021758 A1   Jan. 26, 2017

(51) Int. Cl.
  *B60Q 1/46*     (2006.01)
  *B60Q 1/06*     (2006.01)
  (Continued)

(52) U.S. Cl.
  CPC .............. *B60Q 1/06* (2013.01); *B60Q 1/2657* (2013.01); *B60Q 1/2661* (2013.01); *B60Q 1/46* (2013.01);
  (Continued)

(58) Field of Classification Search
  CPC ....... B60C 1/0029; B60C 1/0035; B60C 1/06; B60C 1/2642; B60C 1/2646; B60C 1/2657; B60C 1/2661; B60C 1/2692; B60C 1/36; B60C 1/40; B60C 1/425; B60C 1/46; B60R 1/1207; B60R 2021/132; B60R 2021/134; B60R 2021/135; B60R 21/13; B60R 21/131; F21V 21/26; F21V 21/28–21/30; F21S 48/211; F21S 48/212
  See application file for complete search history.

(56) References Cited

U.S. PATENT DOCUMENTS 3,683,842 A  *  8/1972  Logan .................. B60Q 1/2657
                                                              116/28 R
4,413,451 A  *  11/1983  Featherstone ........ B60Q 1/2657
                                                                277/553
(Continued)

FOREIGN PATENT DOCUMENTS

EP        0458761        11/1991

OTHER PUBLICATIONS

Ew Holland Agriculture, "New Holland T4F/N/V, T4.65,14.75, T4.85, T4.95 and T4.105," brochure, 18 pages (2014) CNHI International SA Communications & Advertising, www.newholland.com.

(Continued)

*Primary Examiner* — Anh Mai
*Assistant Examiner* — Steven Horikoshi
(74) *Attorney, Agent, or Firm* — Michael Best & Friedrich LLP

(57) ABSTRACT

A light fixture for a vehicle with a foldable roll-over protection structure includes a light and a linkage assembly coupling the light to a portion of the vehicle. The light is operable to rotate relative to the vehicle concurrently with the foldable roll-over protection structure via the linkage assembly between a first position corresponding to an upright position of the foldable roll-over protection structure and a second position corresponding to a folded position of the foldable roll-over protection structure. An angular displacement of the light between the first position and the second position is less than an angular displacement of the foldable roll-over protection structure between the upright position and the folded position.

18 Claims, 4 Drawing Sheets

(51) Int. Cl.
*B60R 21/13* (2006.01)
*F21V 21/26* (2006.01)
*B60Q 1/26* (2006.01)

(52) U.S. Cl.
CPC .............. *B60R 21/13* (2013.01); *F21V 21/26* (2013.01); *B60R 2021/134* (2013.01)

(56) References Cited

U.S. PATENT DOCUMENTS 5,121,306 A    6/1992   Palmisano
8,528,924 B1 *   9/2013   Bartel .................... B60R 21/13
                                                                                                       280/156

OTHER PUBLICATIONS

EP161796388 Extended European Search Report dated Jan. 24, 2017 (5 pages).

* cited by examiner

FOLDABLE LIGHT FIXTURE

BACKGROUND OF THE INVENTION

The present disclosure relates to a mechanism for attaching a light to a vehicle, and more particularly to a mechanism for movably attaching a light to a roll-over protection structure of a vehicle.

Certain vehicles often include roll-over protection structures or roll-over bars to protect a driver and any passengers in the event of a vehicle roll-over. Such a protection system may be implemented on vehicles such as tractors and other farm vehicles, mining vehicles, all-terrain vehicles, and passenger cars and trucks. In certain vehicles, the roll-over protection structure is the tallest portion of the vehicle and is therefore at least partially foldable to decrease the overall height of the vehicle when the vehicle is not in use or when the vehicle is in storage.

These vehicles often also include light fixtures to illuminate the path along which the vehicle is driving and to assist with navigation, provide a warning or distress call, or provide some information to another vehicle, individual, or group. This light is often attached to the vehicle in a location to provide proper illumination without distracting or interrupting the field of view of the user.

SUMMARY OF THE INVENTION

A light fixture for a vehicle with a foldable roll-over protection structure includes a light and a linkage assembly coupling the light to a portion of the vehicle. The light is operable to rotate relative to the vehicle concurrently with the foldable roll-over protection structure via the linkage assembly between a first position corresponding to an upright position of the foldable roll-over protection structure and a second position corresponding to a folded position of the foldable roll-over protection structure. An angular displacement of the light between the first position and the second position is less than an angular displacement of the foldable roll-over protection structure between the upright position and the folded position.

A method of stowing a light fixture secured to a foldable portion of a roll-over protection structure of a vehicle includes rotating the roll-over protection structure through a first angular displacement from an upright position to a folded position, whereby the rotating rotates a light of the light fixture through a second angular displacement from a first position to a second position, the second angular displacement less than the first angular displacement.

A linkage assembly for attaching a light to a vehicle with a roll-over protection structure configured to transition between an operable position and a stowed position includes a base member fixed to the vehicle. A first linkage is rotatably coupled to the base member and a second linkage is coupled to the first linkage, the light, and to the rolling protection structure. The light is concurrently movable with the roll-over protection structure such that an angular displacement of the light between a first position and a second position is less than an angular displacement of the roll-over protection structure between the operable position and the stowed position. The first position corresponds to the operable position and the second position corresponds to the stowed position of the roll-over protection structure.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
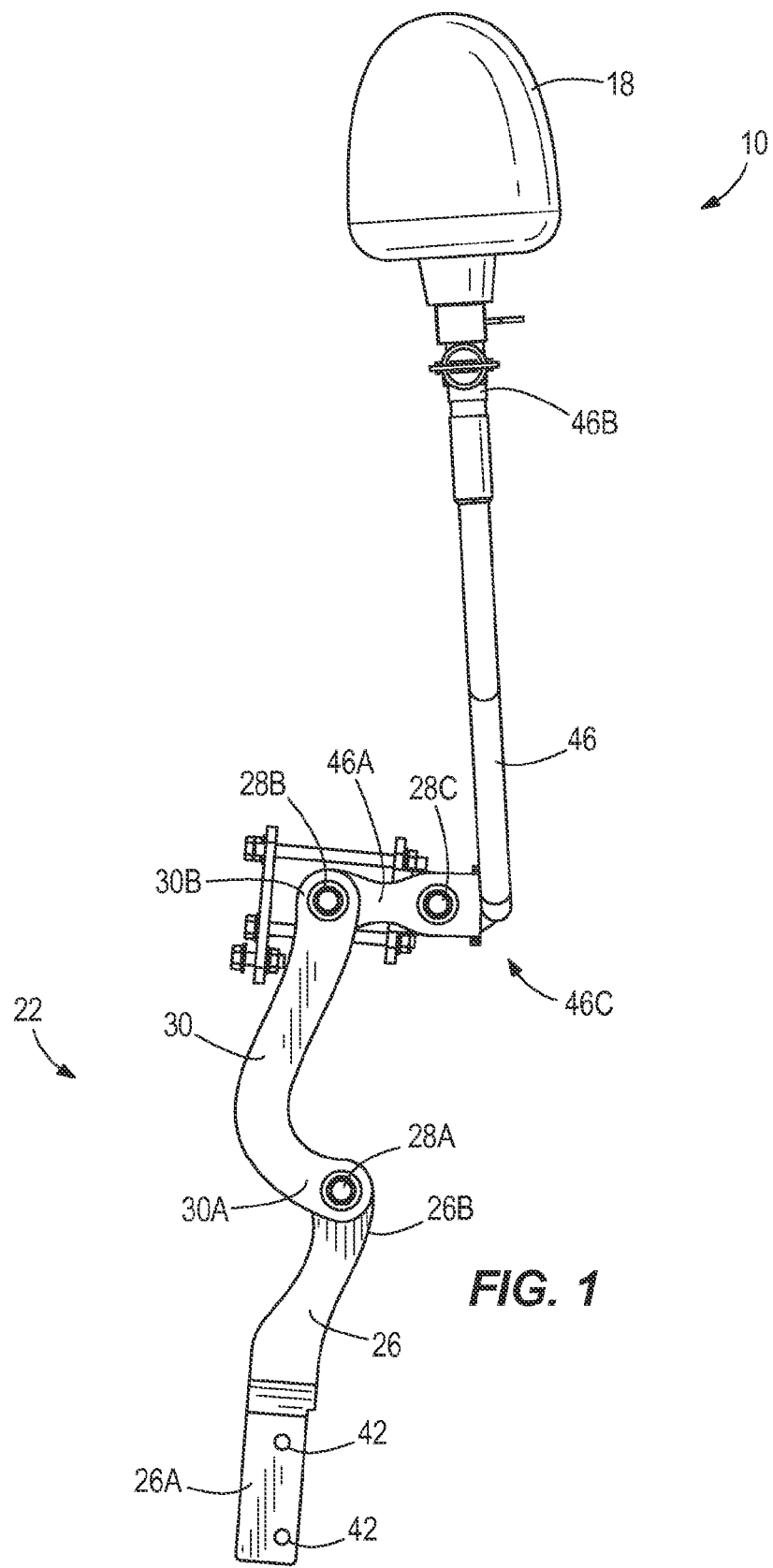
FIG. 1 is a side view of a vehicle light fixture assembly.
Figure 2:
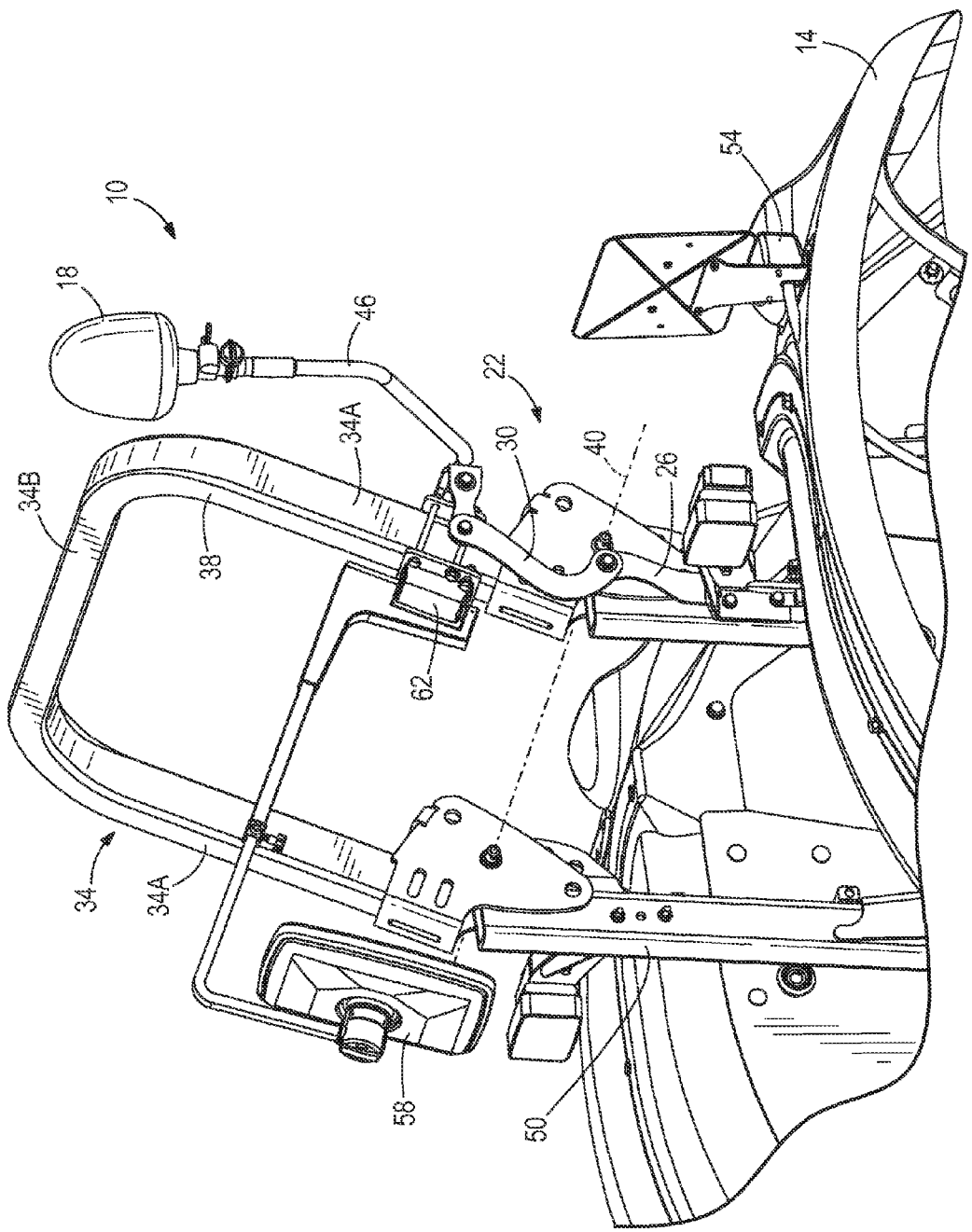
FIG. 2 is a perspective view of the light fixture assembly of FIG. 1 attached to a vehicle and a roll-over protection structure of the vehicle.
Figure 3:
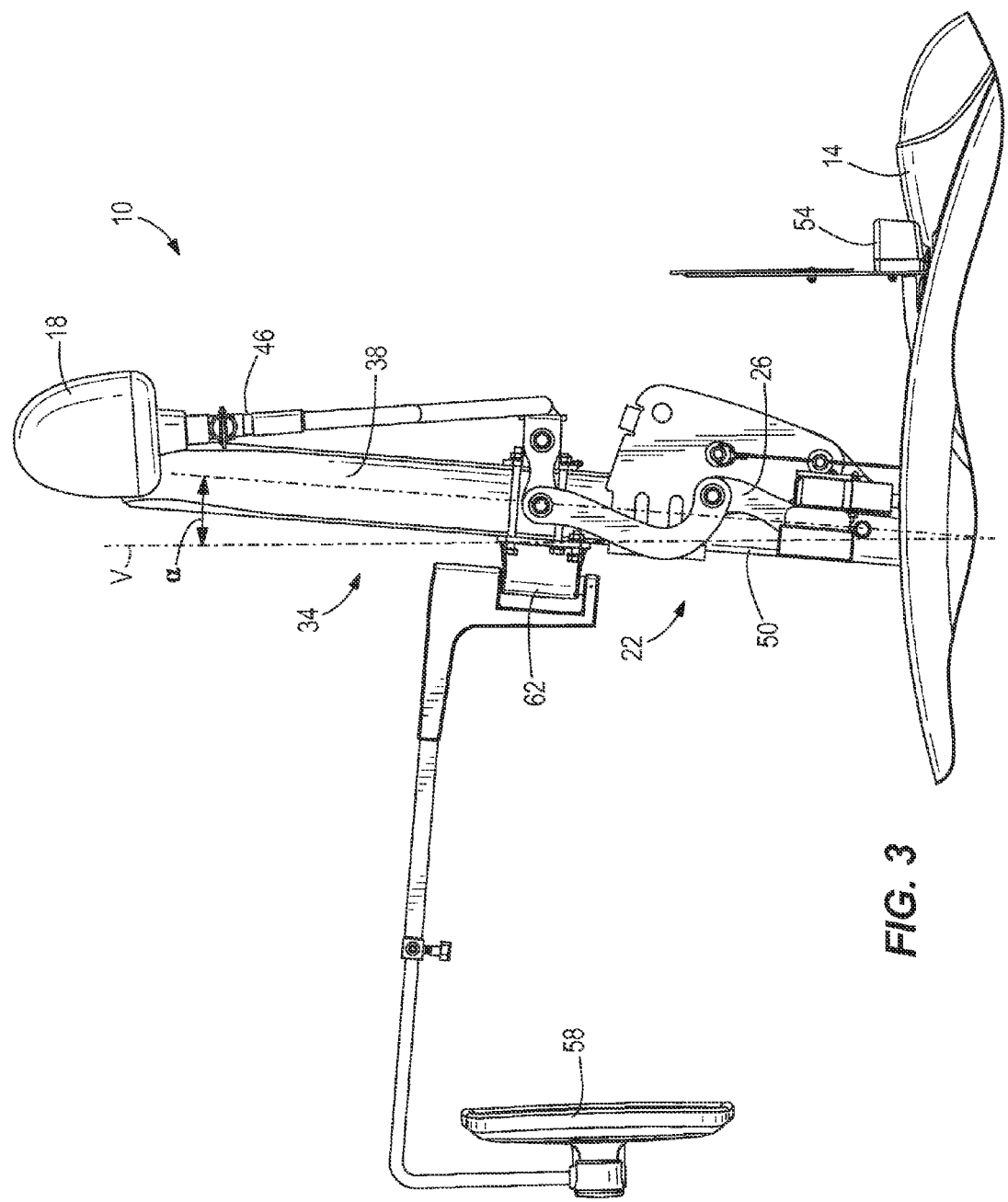
FIG. 3 is a side view of the light fixture of FIG. 1 attached to the vehicle and the roll-over protection structure, with the roll-over protection structure in a substantially vertical or upright position.
Figure 4:
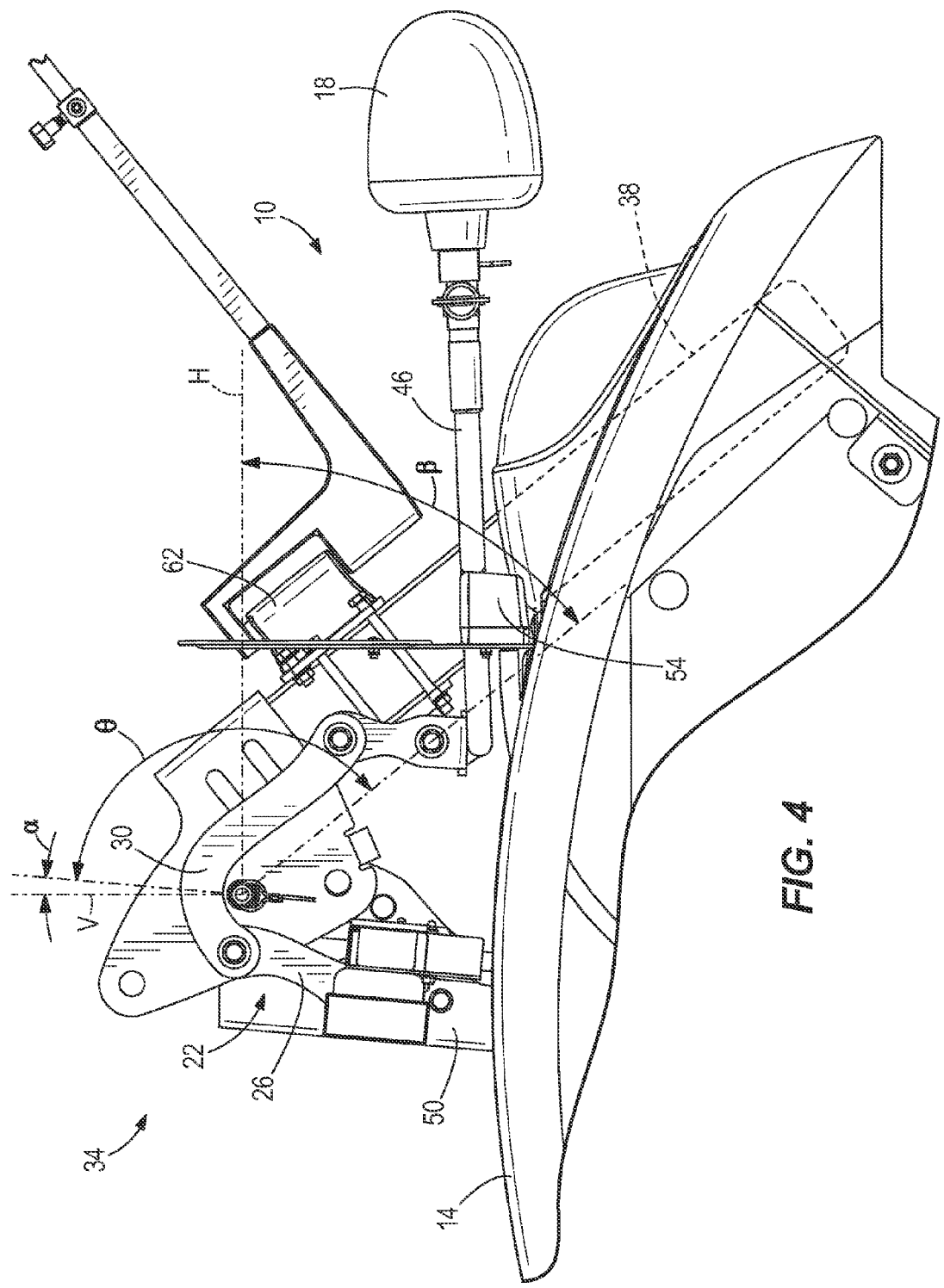
FIG. 4 is a side view of the light fixture of FIG. 1 attached to the vehicle and the roll-over protection structure, with the roll-over protection structure in a folded position.

As shown in FIG. 1, a light fixture 10 for a vehicle includes a light 18 and a supporting member or linkage assembly 22 for attaching the light 18 to the vehicle 14 (FIGS. 2-4). The supporting member 22 includes a first linkage 26, a second linkage 30 rotatable relative to the first linkage 26, and a third linkage 46 fixed to the light 18 and rotatable relative to the second linkage 30 (FIGS. 2-4).

The first linkage or base member 26 is arcuately contoured between a first end 26A and a second end 26B and includes a plurality of orifices 42 at or near the first end 26A for fixing the first linkage 26 to the vehicle 14. Screws, bolts, or other connectors may be threaded or otherwise positioned through the orifices 42 and mating orifices or slots (not shown) on the vehicle 14 to fix the first linkage 26 to the vehicle 14. The second end 26B of the first linkage 26 includes an aperture for alignment and rotational mating with a similar aperture on the second linkage 30. The first linkage 26 may extend from the vehicle 14, as shown in FIGS. 2-4, or may alternatively be integrally formed with the vehicle 14.

The second linkage 30 is also arcuately contoured between a first end 30A and a second end 30B and is rotatable relative to the first linkage 26 about a connector 28A such as a bolt located at the first end 30A of the second linkage 30. The second end 30B of the second linkage 30 includes an additional aperture for alignment and rotational mating with a similar aperture on the third linkage 46.

The third linkage, or light mount 46, is an L-shaped bracket with a first end 46A, a second end 46B, and an elbow region 46C between the two ends 46A, 46B defining a change in direction. At the first end 46A, the light mount 46 is attached to and rotatable about the second linkage 30 via a connector 28B. At the second end 46B, the light mount 46 removably secures the light 18. The length between the elbow 46C and the second end 46B of the light mount 46 may be adjustable to allow a variable height of the light 18, and may optionally include one or more bends. The light mount 46 includes a mounting connector 28C at or near the elbow 46C for fixing the light mount 46 to a rotatable portion 38 of a roll-over protection structure 34 (FIG. 2). In other embodiments, the first end 46A itself may be considered the third linkage and a light 18 with or without an adjustable shaft can be secured directly to the first end 46A near the connector 28C.

The light 18 provides illumination and may include any known lighting methods including, but not limited to, LEDs, incandescent lights such as halogen lights, and high intensity discharge lamps such as xenon lights. The light 18 may be a beacon light and may flash or rotate. Further, the light 18 may be actuated by a user to turn on and off or may turn on automatically with the vehicle 14, or in response to an external sensor (e.g., light sensor, sensor indicating a warning or failure, etc.).

As shown in FIG. 2, the foldable portion 38 of the roll-over protection structure 34 is capable of transitioning relative to a stationary portion 50 of the roll-over protection structure 34. FIG. 2 illustrates the foldable portion 38 in an intermediate stage between a substantially vertical or operable or upright position (FIG. 3) and a stowed or folded position (FIG. 4). The roll-over protection structure 34 comprises two beams 34A extending upward at or near the passenger area (not shown) with a horizontal cross-beam 34B connecting the two beams. In the upright position, the foldable portion 38 provides protection to the user or occupant if the vehicle 14 overturns or rolls over. In the folded position, the foldable portion 38 is stored to decrease the overall height of the vehicle 14.

The foldable portion 38 rotates about a fixed axis 40 (FIG. 2) in response to a user input. The user input may include physically rotating the foldable portion 38 or may include triggering an electrical or hydraulic system to rotate the foldable portion 38. The light fixture 10 is connected to the roll-over protection structure 34 and is also rotatable by virtue of the supporting member 22. Specifically, as the foldable portion 38 of the roll-over protection structure 34 rotates between the upright position and the folded position, the light fixture 10 concurrently rotates parallel to or in the same plane with the foldable portion 38 between a first position and a second position, i.e., about parallel axes. The concurrent movement of the light fixture 10 with the foldable portion 38 of the roll-over protection structure 34 is achieved without separate user input to the light fixture 10.

As shown in FIG. 3, in the upright position the structure 34 is offset from vertical V (i.e., defined as the upward direction based on the vehicle 14 resting on level ground) by angle $\alpha$, which may be zero degrees, or ±five, ten, fifteen, etc., degrees. In one embodiment, the angle $\alpha$ may be five to ten degrees.

Referring to the transition between FIG. 3 and FIG. 4, the roll-over protection structure 34 has a total angular travel $\theta$ between the upright position and the folded position. As shown in FIG. 4, the foldable portion 38 rotates between approximately 130 and 150 degrees. Alternatively, the total angular travel $\theta$ may be between 90 and 130 degrees or between 150 and 180 degrees.

As shown in FIG. 4, in the folded position, the structure 34 is offset below horizontal H (i.e., defined as 90 degrees offset from vertical) by angle $\beta$. The angular displacement $\beta$ from horizontal H must lower the overall height of the roll-over protection structure 34 and is therefore at or below horizontal (e.g., zero degrees below horizontal, five degrees below horizontal, 10 degrees below horizontal, 20 degrees below horizontal, 30 degrees below horizontal, 45 degrees below horizontal, 60 degrees below horizontal, 90 degrees below horizontal, etc.). In one embodiment, the angular displacement $\beta$ below horizontal is from 45 to 55 degrees.

As also shown in the transition between FIG. 3 and FIG. 4, the light 18 has a total angular displacement between the first position and the second position. In the first position, the light 18 is generally aligned with vertical V (i.e., offset from vertical V by zero degrees, or by ±five to ten degrees from vertical V, etc.), and in the second position, the light 18 is generally aligned with horizontal H (i.e., offset from horizontal H by zero degrees, or by ±five to ten degrees from vertical V, or by ±10 to 20 degrees from vertical V, or by ±20 to 30 degrees from vertical V, etc.). As the roll-over protection structure 34 rotates through a first angular displacement, the light 18 rotates through a second angular displacement less than the first angular displacement. The rotation of the light 18 may be limited by contact with the vehicle 14, for example, contact against a stop 54 used to hold the fixture 10 in the second position.

In the example illustrated by FIGS. 3-4, the light 18 rotates approximately two degrees for every three degrees of rotation of the roll-over protection structure 34, however, this ratio may vary with the upright position of the roll-over protection structure 34 and the first position of the light 18.

In addition to the light fixture 10, the roll-over protection structure 34 of FIGS. 2-4 is further connected to a mirror 58. The mirror 58 provides rearward visibility for a user of the vehicle 14 without having to physically turn around. As shown, the mirror 58 is fixed to the foldable portion 38 of the roll-over protection structure 34, and therefore rotates into a position which increases the total height of the vehicle 14 when the roll-over protection structure 34 is in the storage position. Therefore, the mirror 58 is attached to the foldable portion 38 via a pivoting hinge 62. The hinge 62 allows the mirror to fold into a lowered position to decrease the overall height of the vehicle 14 in the storage position.

Various features of the disclosure are set forth in the following claims.

What is claimed is:

1. A light fixture for a vehicle with a foldable roll-over protection structure, the light fixture comprising:
   a light; and
   a linkage assembly coupling the light to a portion of the vehicle,
   wherein the light is operable to rotate relative to the vehicle concurrently with the foldable roll-over protection structure via the linkage assembly between a first position corresponding to an upright position of the foldable roll-over protection structure and a second position corresponding to a folded position of the foldable roll-over protection structure, and
   wherein an angular displacement of the light between the first position and the second position is less than an angular displacement of the foldable roll-over protection structure between the upright position and the folded position.

2. The light fixture of claim 1, wherein the linkage assembly includes a first linkage fixed relative to the vehicle and connected to a second linkage rotatable relative to the first linkage and coupled to the light.

3. The light fixture of claim 2, further including a third linkage rotatably connected between the first linkage and the second linkage.

4. The light fixture of claim 2, wherein the second linkage is attached to the foldable roll-over protection structure.

5. The light fixture of claim 1, wherein the foldable roll-over protection structure is rotatable about an axis and wherein the light is rotatable about a second axis parallel to the first axis.

6. The light fixture of claim 1, wherein the angular displacement of the foldable roll-over protection structure between the upright position and the folded position is at least ninety degrees.

7. The light fixture of claim 1, wherein the angular displacement of the foldable roll-over protection structure between the upright position and the folded position is greater than 120 degrees and wherein the angular displacement of the light between the first position and the second position is less than 100 degrees.

8. The light fixture of claim 1, wherein in the first position the light is in a substantially vertical position with respect to the vehicle and wherein in the second position the light is in a substantially horizontal position.

9. A method of stowing a light fixture secured to a foldable portion of a roll-over protection structure of a vehicle, the method comprising:
rotating the roll-over protection structure through a first angular displacement from an upright position to a folded position, whereby the rotating rotates a light of the light fixture through a second angular displacement from a first position to a second position, the second angular displacement less than the first angular displacement.

10. The method of claim 9, wherein rotating the roll-over protection structure through the first angular displacement includes rotating the roll-over protection structure about a fixed axis.

11. The method of claim 10, wherein rotating the light through the second angular displacement includes rotating the light about a second axis not coextensive with the fixed axis.

12. The method of claim 9, wherein rotating the roll-over protection structure includes manually rotating the roll-over protection structure.

13. The method of claim 9, wherein the first angular displacement is at least ninety degrees.

14. The method of claim 9, wherein rotating the light from the first position to the second position further comprises:
rotating a first linkage relative to a second linkage, wherein the first linkage is coupled to the vehicle and the second linkage is coupled to the light.

15. A linkage assembly for attaching a light to a vehicle with a roll-over protection structure configured to transition between an operable position and a stowed position, the linkage assembly comprising:
a base member fixed to the vehicle;
a first linkage rotatably coupled to the base member; and
a second linkage coupled to the first linkage, coupled to the light, and coupled to the roll-over protection structure,
wherein the light is concurrently movable with the roll-over protection structure such that an angular displacement of the light between a first position and a second position is less than an angular displacement of the roll-over protection structure between the operable position and the stowed position, wherein the first position corresponds to the operable position and the second position corresponds to the stowed position of the roll-over protection structure.

16. The linkage assembly of claim 15, wherein the angular displacement between the operable position and the stowed position is greater than or equal to ninety degrees.

17. The light fixture of claim 15, wherein the foldable roll-over protection structure is rotatable about a first axis and wherein the light is rotatable about a second axis parallel to the first axis.

18. The light fixture of claim 15, wherein in the first position the light is in a substantially vertical orientation and wherein in the second position the light is in a substantially horizontal orientation.

* * * * *

UNITED STATES PATENT AND TRADEMARK OFFICE
CERTIFICATE OF CORRECTION

PATENT NO.       : 9,764,680 B2                                Page 1 of 1
APPLICATION NO.  : 14/805609
DATED            : September 19, 2017
INVENTOR(S)      : Miguel Tamay It is certified that error appears in the above-identified patent and that said Letters Patent is hereby corrected as shown below:

On the Title Page

Under the subheading "OTHER PUBLICATIONS," Line 1: replace the word "Ew" with the word --New--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*